United States Patent [19]
Mulder

[11] Patent Number: 5,520,735
[45] Date of Patent: May 28, 1996

[54] NOZZLE ASSEMBLY AND SYSTEM FOR APPLYING POWDER TO A WORKPIECE

[75] Inventor: Douglas C. Mulder, Wellington, Ohio

[73] Assignee: Nordson Corporation, West Lake, Ohio

[21] Appl. No.: 309,427

[22] Filed: Sep. 20, 1994

Related U.S. Application Data

[63] Continuation-in-part of Ser. No. 906,677, Jun. 30, 1992, Pat. No. 5,474,609.

[51] Int. Cl.$^6$ .................................................... B05B 5/00
[52] U.S. Cl. ...................... 118/308; 118/620; 118/624; 239/3; 239/105; 239/690
[58] Field of Search ............................. 118/308, 319, 118/326, 620, 622, 624; 239/3, 290, 291, 690, 693, 697

[56] References Cited

U.S. PATENT DOCUMENTS

| | | |
|---|---|---|
| 3,558,052 | 1/1971 | Dunn . |
| 3,746,254 | 7/1973 | Duncan et al. . |
| 3,828,729 | 8/1974 | Goodridge . |
| 3,870,375 | 3/1975 | Duncan et al. . |
| 3,901,184 | 8/1975 | Payne et al. . |
| 3,904,930 | 9/1975 | Waldron et al. . |
| 3,918,401 | 11/1975 | Blakeslee . |
| 3,940,061 | 2/1976 | Gimple et al. .................. 239/105 X |
| 4,109,027 | 8/1978 | Crose . |
| 4,138,161 | 2/1979 | Payne . |
| 4,158,071 | 6/1979 | Jordan et al. . |
| 4,165,134 | 8/1979 | Payne . |
| 4,180,844 | 12/1979 | Peck . |
| 4,183,974 | 1/1980 | Coucher et al. . |
| 4,248,379 | 2/1981 | Hollstein et al. . |
| 4,291,640 | 9/1981 | Payne et al. . |
| 4,314,669 | 2/1982 | Moos . |
| 4,399,945 | 8/1983 | Rund . |
| 4,409,009 | 10/1983 | Lissy . |
| 4,662,309 | 5/1987 | Mulder . |
| 4,675,203 | 6/1987 | Scarbrough . |
| 4,987,001 | 1/1991 | Knobbe et al. . |
| 5,018,910 | 5/1991 | Weiss . |

FOREIGN PATENT DOCUMENTS

| | | |
|---|---|---|
| 0185479 | 6/1986 | European Pat. Off. . |
| 0268126 | 5/1988 | European Pat. Off. . |
| 2159182 | 6/1973 | France . |
| 60752 | 3/1991 | Japan . |
| 1497558 | 1/1978 | United Kingdom . |
| 2003754 | 3/1979 | United Kingdom . |

OTHER PUBLICATIONS

Nordson Technical Publication 32–7–1.
H. L. Fisher Manufacturing Company, Inc. Training and Serivce Manual for Model No. 107 Can End Post–Repair Spray Maching.

Primary Examiner—James Engel
Attorney, Agent, or Firm—Tarolli, Sundheim, Covell, Tummino & Szabo

[57] ABSTRACT

An apparatus is operable to sequentially spray powder onto each workpiece of a plurality of workpieces. The powder flows from an improved nozzle assembly as a series of pulses. Accumulation of powder on surfaces in the nozzle assembly is retarded by conducting a flow of fluid (air) from a source of fluid pressure through openings in the surfaces in the nozzle assembly. Thus, a plurality of openings are formed in a side wall of the nozzle assembly to enable fluid to flow through the openings in the side wall into the flow path of air and powder through the nozzle assembly to retard accumulation of powder on an inner side surface of the side wall. An inner deflector has an end surface which faces toward the workpiece and on which powder tends to accumulate. A flow of fluid is conducted through openings in the end surface of the inner deflector to retard the accumulation of powder on the end surface of the inner deflector.

51 Claims, 5 Drawing Sheets

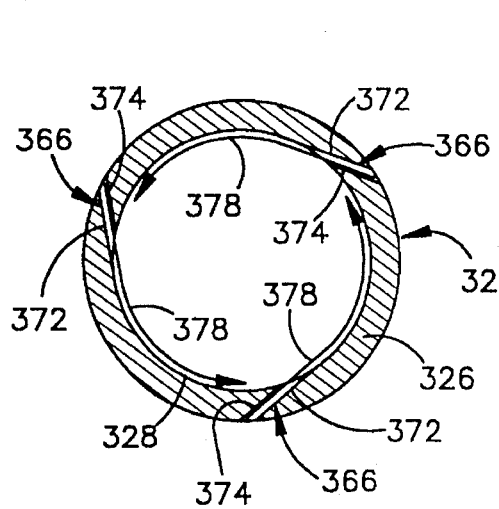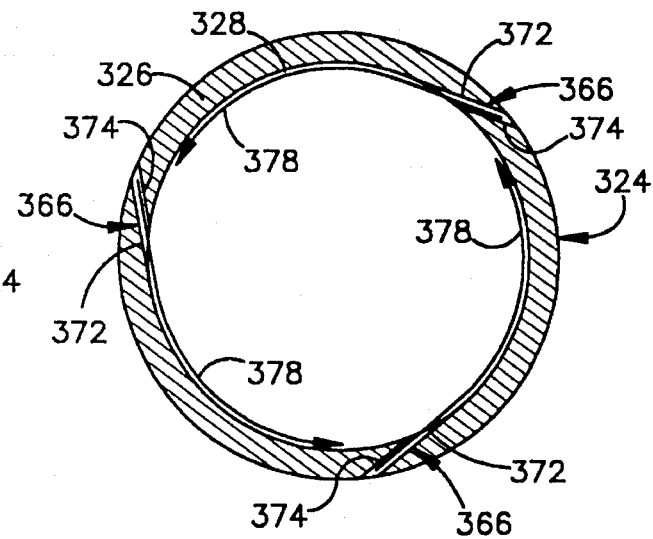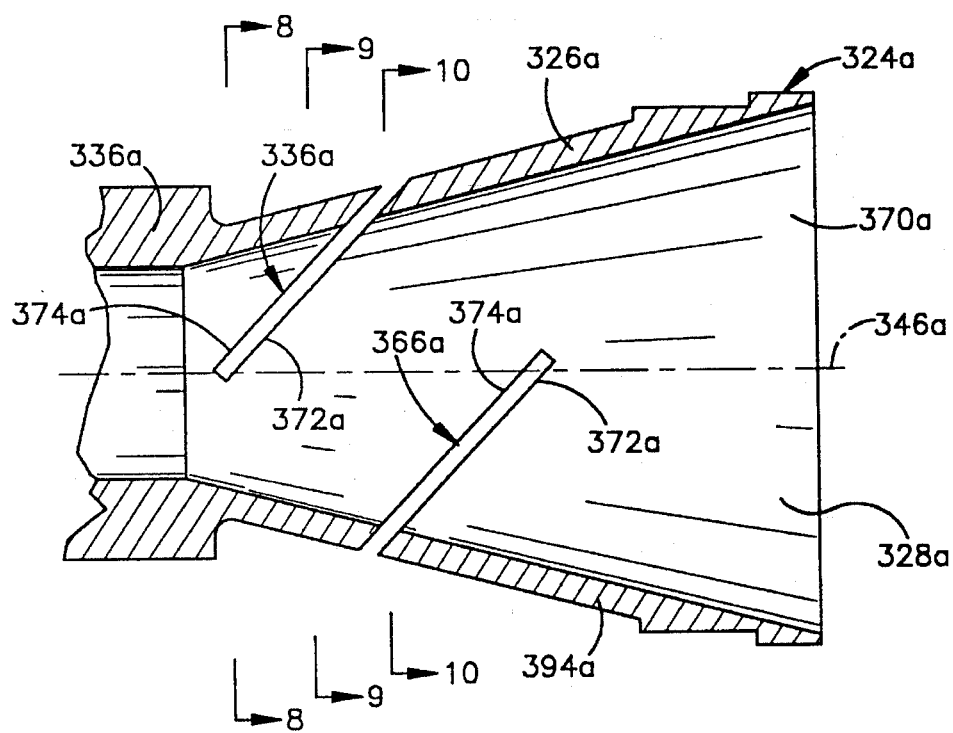

NOZZLE ASSEMBLY AND SYSTEM FOR APPLYING POWDER TO A WORKPIECE

RELATED APPLICATION

This application is a continuation-in-part of U.S. patent application Ser. No. 07/906,677, filed Jun. 30, 1992 by Douglas C. Mulder, et al. and entitled "Method and Apparatus for Applying Powder to Workpieces", now U.S. Pat. No. 5,474,609. The benefit of the aforementioned application Ser. No. 07/906,677 has been and hereby is claimed.

BACKGROUND OF THE INVENTION

The present invention relates to a new and improved method and apparatus for use in applying powder to workpieces and, more specifically, to an improved nozzle assembly and method which may be used in such an apparatus.

A known apparatus for applying powder to workpieces is disclosed in U.S. Pat. No. 4,987,001 issued Jan. 22, 1991 and entitled "Method and Apparatus for Coating the Interior Surface of Hollow, Tubular Articles". This known apparatus includes a pump which is operable to produce a pulsed flow of air with powder entrained therein. The powder flows from the pump through a charging apparatus which electrostatically charges the powder in the pulses of air. A nozzle assembly directs the pulses of air with electrostatically charged powder therein toward a workpiece.

During the use of apparatus similar to the apparatus disclosed in U.S. Pat. No. 4,987,001, powder may tend to build up within the nozzle assembly which directs the flow of air and powder toward a workpiece. The build up of powder in the nozzle assembly may tend to interfere with the flow of air and powder through the nozzle assembly. In addition, the build up of powder in the nozzle assembly may result in an uneven distribution of powder on at least some workpieces and the application of powder to at least some workpieces in a pattern other than a desired pattern.

SUMMARY OF THE INVENTION

The present invention relates to an apparatus for use in applying powder to workpieces. The apparatus includes a new and improved nozzle assembly which directs a flow of air with powder entrained therein toward the workpieces. The apparatus may also include a pump which is operable to produce a flow of air with powder entrained therein. A charging apparatus may be connected in fluid communication with the pump to electrostatically charge powder in the flow of air.

In accordance with a feature of the present invention, the nozzle assembly is constructed so as to retard the accumulation of powder on surfaces of the nozzle assembly. This may be accomplished by conducting a flow of fluid, such as air, to the surfaces of the nozzle assembly on which powder tends to accumulate. Thus, fluid may be directed through openings in a surface on which powder tends to accumulate.

The surface on which powder tends to accumulate may be a surface of a side wall in the nozzle assembly. A flow of fluid is conducted through openings, such as slots, in the side wall. The flow of fluid through the openings retards the accumulation of powder on the side wall.

The surface on which powder tends to accumulate may be an end surface of the nozzle assembly. A flow of fluid, such as air, may be conducted through openings in the end surface of the nozzle assembly to retard accumulation of powder on the end surface of the nozzle assembly.

The nozzle assembly may advantageously be associated with an apparatus in which a diverter is provided to divert a portion of each pulse of a series of pulses of air with powder entrained therein away from the nozzle assembly. The fluid which is directed through openings in a surface in the nozzle assembly on which powder tends to accumulate, causes the powder to become suspended in the fluid. The diverter induces a flow of the fluid, with the powder suspended therein, in a reverse or upstream direction from the nozzle assembly to the diverter. The apparatus with which the nozzle assembly is associated may advantageously be provided with an excess powder collector. The excess powder collector tends to induce a flow of the fluid, with powder suspended therein, in a downstream or forward direction from the nozzle assembly.

BRIEF DESCRIPTION OF THE DRAWINGS

The foregoing and other objects and features of the present invention will become more apparent upon a consideration of the following description taken in connection with the accompanying drawings, wherein:

FIG. 5 is a sectional view, taken generally along the line 5—5 of FIG. 4 further illustrating the construction of the nozzle cone;

FIG. 6 is a sectional view, taken generally along the line 6—6 of FIG. 4, further illustrating the construction of the nozzle cone;

FIG. 7 is a fragmentary sectional view, generally similar to FIG. 4, illustrating the construction of a second embodiment of the nozzle cone;

DESCRIPTION OF SPECIFIC PREFERRED EMBODIMENTS OF THE INVENTION

General Description

Figure 1:
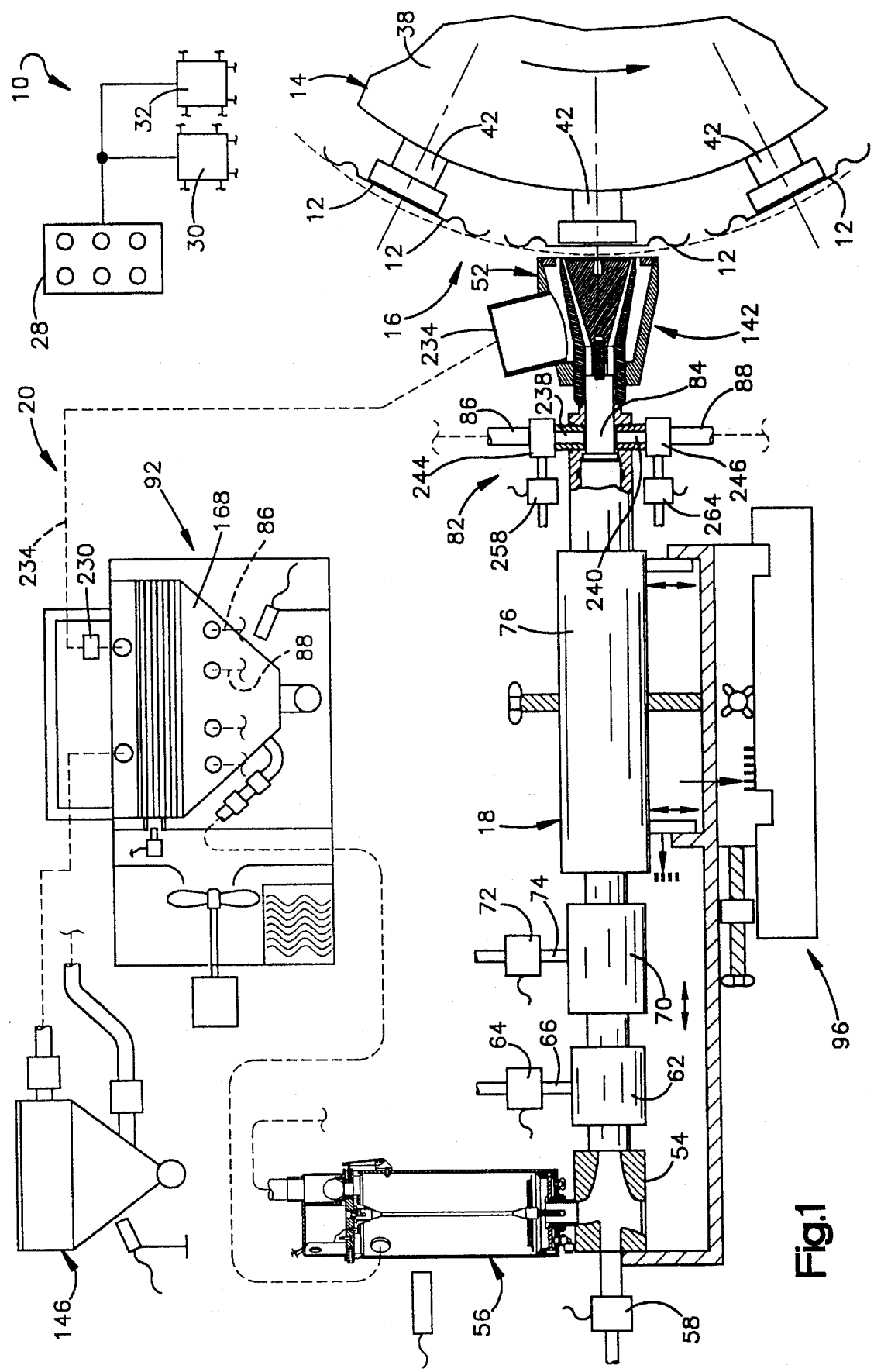
FIG. 1 schematic illustration of an apparatus which is used to apply powder to workpieces.

An apparatus 10 (FIG. 1) for sequentially applying powder to workpieces 12 includes a conveyor assembly 14 which sequentially moves the workpieces to a work station 16. A powder spray gun 18 is operable to spray powder onto each of the workpieces 12 in turn at the work station 16. A powder supply system 20 supplies powder to the spray gun 18. The conveyor 14, powder spray gun 18 and powder supply system 20 may be disposed on a platform having surfaces which are engageable to move the apparatus 10 between various locations.

The apparatus 10 includes an operator's control panel 28 (FIG. 1) which is positioned at an operator's station. A controller 30 includes electrical controls for the apparatus 10. A second controller 32 includes pneumatic controls for the apparatus 10. An air dryer (not shown) is mounted adjacent to the controllers 30 and 32. The control panel 28 and controllers 30 and 32 are disposed on the platform along with the conveyor 14, powder spray gun 18 and powder supply system 20.

It is contemplated that an apparatus 10 may be utilized to apply powder to many different types of workpieces. However, the specific apparatus 10 illustrated in FIG. 1 has been designed for use in sequentially applying a powder coating to can lids. A can lid conveyor assembly 14 includes a circular turret 38.

The turret 38 rotates in a counterclockwise direction, as viewed in FIG. 1, about a horizontal axis which extends perpendicular to and is in the same plane as a horizontal central axis of the spray gun 18. A plurality of workpiece holding chucks 42 extend radially outwardly from the turret 38 to grip the can lids 12. The can lids 12 are held on the chucks 42 by suction which is applied to a side of the can lid opposite to a side which is to be coated.

As the turret 38 indexes, each can lid 12 is gripped in turn by one of the chucks 42 at a pickup station. As the turret continues to index, it moves each can lid 12 in turn to the work station 16. As each can lid 12 is indexed to the work station 16, rotation of the turret 38 is momentarily interrupted.

The spray gun 18 is then operated to spray powder onto the surface of a can lid 12. Although the powder could be applied to the can lid 12 in any desired pattern, the powder is applied in an annular band to cover a circular score line on an easy open can lid 12. The powder is applied to the can lid surface which faces outwardly toward the spray gun 18 (FIG. 1). Indexing of the turret 38 is then continued to move the next succeeding can lid to the work station 16.

The can lids 12 are sprayed at a very high rate. Thus, in one specific embodiment of the invention, approximately three hundred can lids 12 were sprayed during each minute of operation of the apparatus 10. Therefore, the spraying of the annular band of powder onto each can lid 12 must occur during a relatively short period of time. In one specific embodiment of the invention, indexing of the turret 38 is stopped to hold a can lid stationary for a period of approximately one hundred and twenty-five milliseconds. An annular band of powder is sprayed onto each can lid 12 in turn during operation of the spray gun 18 for sixty to ninety milliseconds. It should also be understood that the specific operating rates for the apparatus 10 have been set forth herein for purposes of clarity of description and not to limit the invention to any specific operating rate.

Although a nozzle assembly 52 has been specifically designed to apply an annular band of powder to a can lid 12 at the work station 16, it is contemplated that the design of the nozzle assembly 52 could be changed to apply powder in a pattern having a configuration other than annular and to a product other than a can lid. Thus, it is contemplated that the nozzle assembly 52 could be designed to apply powder to the entire surface of the can lid 12 if desired.

After the annular band of powder has been sprayed onto the surface of a can lid 12, the can lid is moved to a discharge station where the can lid is released from a chuck 42. As noted above, the can lid is held on the chuck 42 by suction which is applied to the can lid. At the discharge station, the application of suction to the surface of the can lid is interrupted to release the can lid for downward movement under the influence of gravity. Although many different types of indexing machines 38 could be used to convey the can lids 12, one satisfactory indexing machine is that used for a Model #107 Can End Post Repair Spray Machine, manufactured by H. L. Fisher Manufacturing Company, Inc. of Des Plaines, Ill., U.S.A. It is contemplated that a conveyor assembly other than a turret type indexing machine could be used to sequentially convey can lids 12 to the work station 16.

The nozzle assembly 52 on the powder spray gun 18 sprays powder on a can lid 12 held by the turret 38 without engaging the can lid. Since the nozzle assembly 52 does not engage a can lid 12 at the work station 16, the spray gun 18 can commence spraying powder onto the can lid as soon as the can lid has been moved to the work station 16. This enables the can lid 12 to be moved to the work station 16, sprayed with powder by the spray gun 18, and moved away from the work station in a relatively short time.

In addition to the nozzle assembly 52, the spray gun 18 has a venturi-type powder pump 54 which is connected with a powder feed container 56. Upon actuation of a solenoid valve 58 to an open condition, air is conducted through the venturi-type pump 54 and powder from the container 56 is entrained in the flow of air. An amplifier 62 is connected with the pump 54.

Upon operation of a solenoid valve 64, which is operated simultaneously with solenoid valve 58, air under pressure is conducted through a conduit 66 to the amplifier 62. This air is injected into the flow of air and powder conducted through the amplifier 62 from pump 54 to provide an additional pumping action. The flow of air with powder entrained therein moves from the amplifier 62 to a diffuser 70. Upon actuation of a solenoid valve 72 to an open condition, air under pressure is conducted through a conduit 74 to the diffuser 70.

From the diffuser 70, the flow of air with powder entrained therein enters an electrostatic charging unit 76. The electrostatic charging unit 76 is of the triboelectric type and includes a plurality of tortuously curved tubes which extend along the central axis of the powder spray gun 18. As the air and powder passes through these tubes, the powder frictionally contacts the walls of the tubes and picks up an electrostatic charge. The construction of the pump 54, amplifier 62, diffuser 70 and electrostatic charging unit 76 is the same as is described in the U.S. Pat. No. 4,987,001 issued Jan. 22, 1991 and entitled "Method and Apparatus for Coating the Interior Surface of Hollow, Tubular Articles", which is hereby expressly incorporated herein, in its entirety, by this reference thereto.

A diverter assembly 82 (FIG. 1) is provided between the nozzle assembly 52 and electrostatic charging unit 76. The diverter assembly 82 selectively interrupts the flow of powder to the nozzle assembly 52 to sharply define the trailing end of the pulse or puff of powder to be applied to a can lid 12. When the diverter assembly 82 is in an active condition it diverts air or air and powder from a main passage 84 to conduits 86 and 88. The conduits 86 and 88 conduct the diverted powder to a powder collector container 92 in the powder supply system 20.

Figure 3:
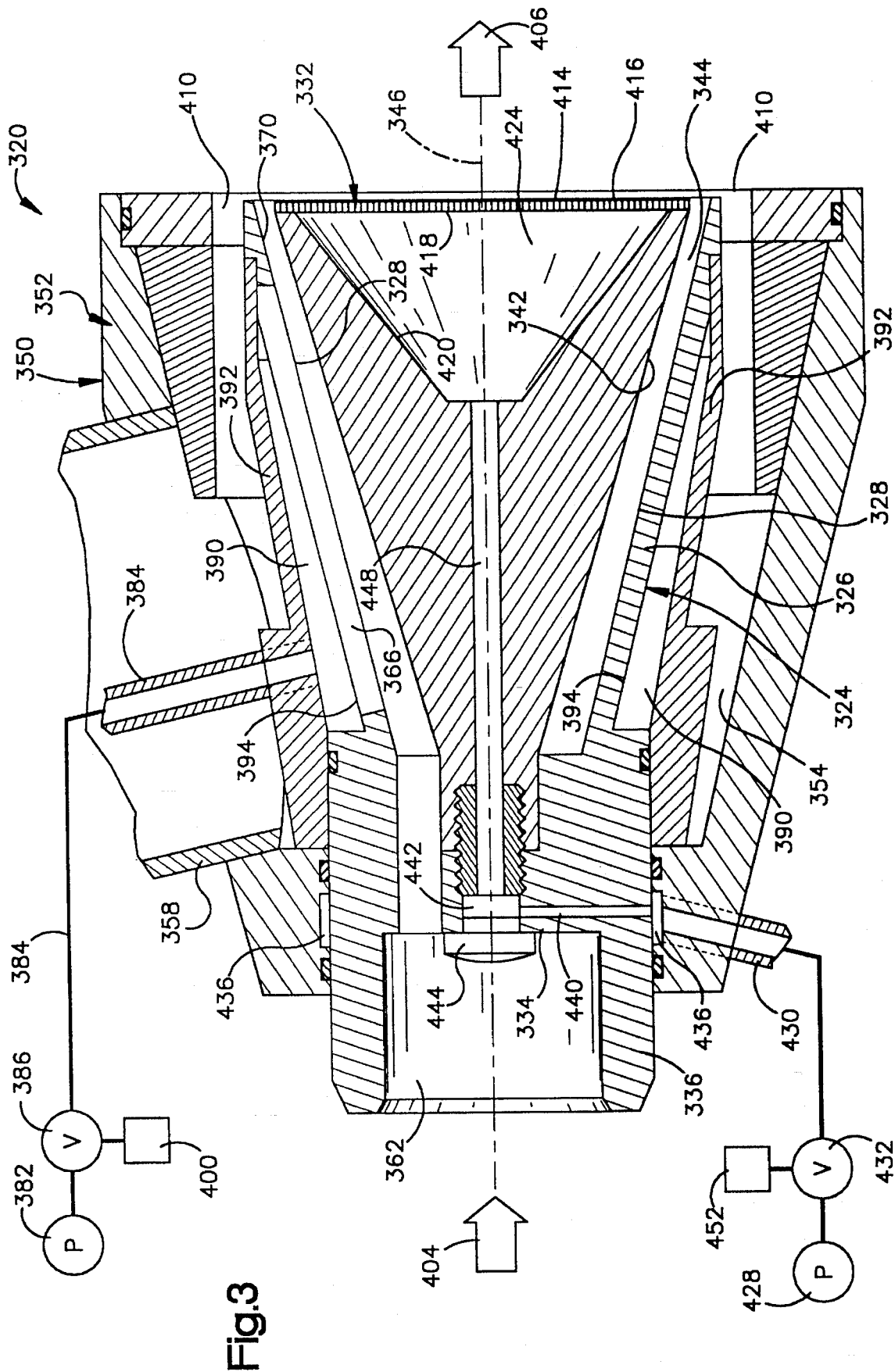
FIG. 3 is an enlarged sectional view, generally similar to FIG. 2, of an improved nozzle assembly capable of being used in the apparatus of FIG. 1 to direct powder toward workpieces and having features to retard accumulation of powder on surfaces of the nozzle assembly.
Figure 8:
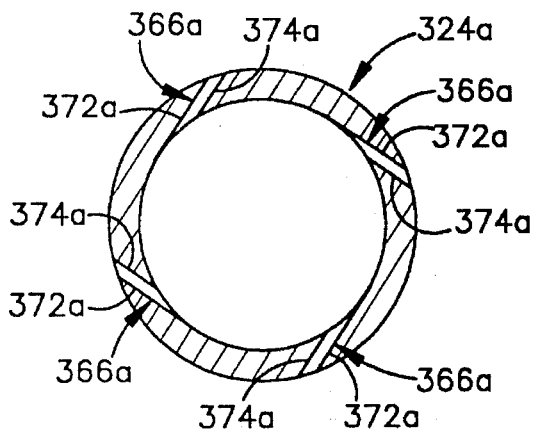
FIG. 8 is a sectional view, taken generally along the line 8—8 of FIG. 7, further illustrating the construction of the nozzle cone.
Figure 9:
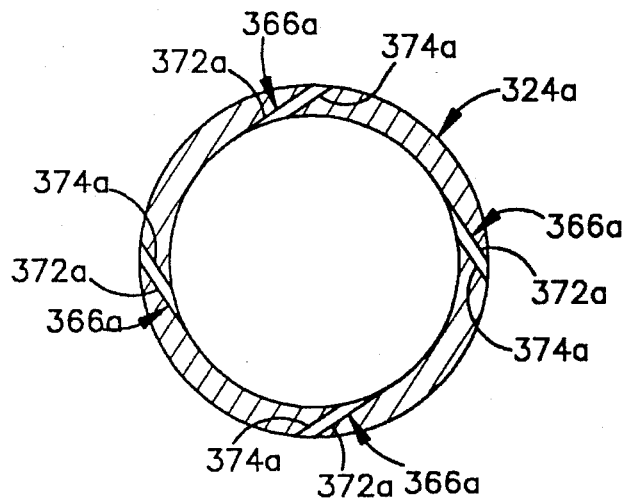
FIG. 9 is a sectional view, taken generally along the line 9—9 of FIG. 7, further illustrating the construction of the nozzle cone.
Figure 10:
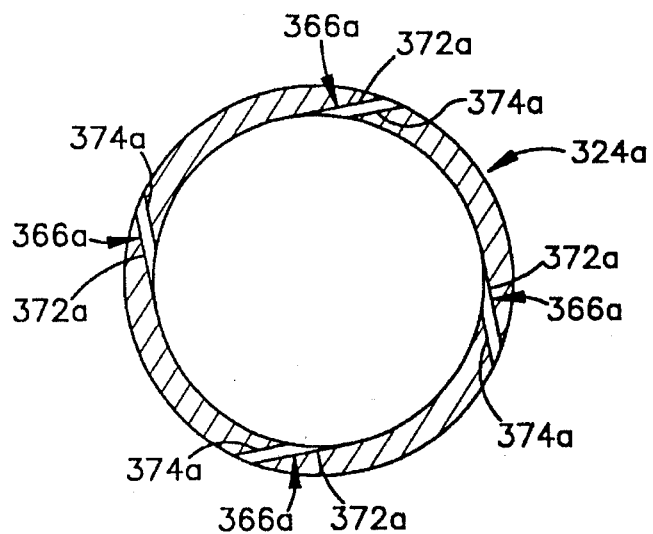
FIG. 10 is a sectional view, taken generally along the line 10—10 of FIG. 7, further illustrating the construction of the nozzle cone.

The nozzle assembly 52 must be accurately positioned relative to the can lid 12 held on workpiece holding chucks 42 of turret 18 at work station 16. If the nozzle assembly 52 is too close to a can lid 12, the can lid may impact against the nozzle during rotation of the turret 38. If the nozzle assembly 52 is positioned too far away from the can lid 12 at the work station 16, on the other hand, the annular band 46 (FIG. 3) of powder will not be accurately applied to the can lid by the nozzle. In one specific embodiment of the invention, the nozzle assembly 52 is spaced approximately ⅛ to 3/16 of an inch from the can lid 12 at the work station 16. Of course, the specific distance between can lid 12 and nozzle assembly 52 will vary depending upon the diameter of the turret 38, geometry of nozzle assembly 52, air pressure to the spray gun pump amplifier 62, and other factors.

In addition to providing for proper placement of the nozzle 52 the desired distance away from can lid 12 along the longitudinal central axis of the powder spray gun 18, it is also necessary to accurately position the nozzle so that it is concentrically located relative to can lid 12. For example, if the nozzle 52 is higher than it should be relative to the work station 16, a band 46 of powder applied to a can lid 12 will be offset upwardly relative to the center of the can lid. Similarly, if the nozzle 52 is offset horizontally relative to a can lid 12 at the work station 16, the annular band of powder applied to the can lid will be offset horizontally relative to the can lid.

To provide for accurate positioning of the nozzle 52 relative to the can lid 12 at work station 16, therefore, a three-axis adjustment assembly 96 (FIG. 2) is provided. Thus, the adjustment assembly 96 is operable to position the nozzle 52 along X, Y and Z axes, where the X axis is considered to be the horizontal longitudinal central axis of the powder spray gun 18. The Y axis is considered to be a horizontal axis perpendicular to the X axis. The Z axis is considered to be a vertical axis which is perpendicular to the X and Y axes.

The powder supply system 20 (FIG. 1) controls the flow of powder to and from the powder spray gun 18. Powder supply system 20 supplies both virgin powder and recycled powder to the spray gun 18. Powder supply system 20 receives powder from diverter assembly 82 and an excess powder collector 142. The excess powder collector 142, draws excess powder which does not adhere to the can lid away from the work station 16 to the powder collector container 92 of supply system 20.

Powder supply system 20 is principally comprised of a bulk powder container 146 and a powder collector container 92. Virgin powder is poured into bulk container 146 and is transported from container 146 to the powder collector container 92 as needed. In powder collector container 92, the virgin powder is mixed with the recycled powder which is returned to the powder collector container from the diverter assembly 82 and excess powder collector 142. This mixed powder is then transported from powder collector container 92, as needed, to the powder feed container 56. Feed container 56 supplies powder to spray gun 18.

Supply system 20 maintains a predetermined minimum quantity of powder in powder feed container 56 and in the powder collector container 92. If the quantity of virgin powder in bulk powder container 146 falls below a minimum predetermined amount of powder, an audible or visual output signal is provided to the operator of the apparatus 10 indicating that container 146 needs to be manually refilled.

The construction and mode of operation of the apparatus 10 is the same as is disclosed in copending U.S. patent application Ser. No. 07/906,677 filed Jun. 30, 1992 and entitled "Methods and Apparatus for Applying Powder to Workpieces". The disclosure in the aforementioned U.S. patent application Ser. No. 07/906,677 should be considered as being incorporated herein, in its entirety, by this reference thereto.

Powder Spray Nozzle Assembly

The powder spray nozzle assembly 52 (FIG. 2) is maintained in a spaced apart relationship with respect to the can lids 12 as they are sequentially moved to the work station 16 (FIG. 1), sprayed with powder at the work station, and moved away from the work station. Although the can lid 12 and nozzle assembly 52 do not engage each other at any time during the process, the nozzle is very close to the can lid when the can lid is at the work station 16. Thus, when the can lid 12 is at the work station 16, a front surface of can lid 12 is spaced approximately ⅛ to 3/16 of an inch from the nozzle 52.

Nozzle assembly 52 includes a generally conical powder flow channel 200 (FIG. 2) through which air with powder entrained therein flows toward the can lid 12. Powder flow channel 200 is formed between an inner deflector cone 202 and an outer nozzle cone 204. The deflector cone 202 engages the center of a stream of air and powder as the stream enters nozzle assembly 52 at an inlet to the nozzle assembly.

When the stream (FIG. 3) of air and powder enters nozzle 52, the stream has a solid circular cross sectional configuration. The deflector cone 202 opens stream as the air and powder flows around a conical outer side surface 208 of the deflector cone. As the stream of air and powder flows around the deflector cone 202, the cross sectional configuration of the stream becomes annular. As deflector cone 202 flares radially outward and stream moves toward can lid 12, the deflector cone 202 opens up the central portion of the stream to increase the inside diameter of the annular cross section of stream. The stream of air and powder leaves the nozzle assembly 52 at an outlet 209.

The outer nozzle cone 204 cooperates with the inner deflector cone 202 to limit the extent to which the deflector cone 202 expands the annular cross sectional configuration of stream of air and powder radially outwardly. Thus, a conical inner side surface 210 on nozzle cone 204 is evenly spaced from outer side surface 208 of deflector cone 202. In one specific embodiment of the invention, outer surface 208 of deflector cone 202 and inner surface 210 of nozzle cone 204 are spaced apart by a radial distance of approximately 0.1875 inches. The annular band 46 of powder deposited on the can lid 12 has approximately the same radial extent. Of course, the spacing between the surfaces of the deflector and nozzle cones 202 and 204 and the radial extent of the band 46 of powder may be different than the foregoing specific dimension if desired.

In one specific embodiment of the nozzle 52, the inner deflector cone 202 had a maximum outside diameter, at the circular axially outer or rightward (as viewed in FIG. 2) end face 206 of the deflector cone, of approximately 2.5 inches. This resulted in the annular band of powder deposited on can lid 12 having all inside diameter of approximately 2.5 inches. Of course, the annular band of powder could have a different diameter if desired.

A body section of the powder spray gun 18 is telescopically inserted into the axially inner or left (as viewed in FIG. 2) end of outer nozzle cone 204 of the nozzle 52. The nozzle 52 is in this way supported by the outer end portion of the body section 214.

In the illustrated embodiment, the deflector and nozzle cones 202 and 204 of the nozzle 52 are shaped to cause the powder to be deposited on the can lid 12 in an annular band. It is contemplated that the deflector and nozzle cones 202 and 204 of the nozzle 52 could have a different configuration so that the powder is deposited on the surface of can lid 12 in a different pattern. By properly shaping the flow path 200 along which the powder flows through the nozzle 52, almost any desired pattern of powder deposition can be obtained on the major side surface of the can lid 12. Moreover, if desired, the entire surface of the can lid 12, or the entire interior of a container, could be coated with powder from an appropriately designed spray nozzle.

Excess Powder Collector

The excess powder collector 142 (FIG. 2) forms part of the nozzle assembly 52. The excess powder collector 142 partially encloses and is supported by the outer nozzle cone 204. Excess powder collector 142 draws a flow of excess powder which does not adhere to can lid 12 away from the can lid and back toward the outer periphery of nozzle assembly 52. The reverse or backflow of oversprayed powder is drawn into a generally conical cavity 218 which is disposed inside a collector housing 220 and extends around the nozzle cone 204. The flow of excess powder away from can lid 12 into cavity 218 prevents powder from entering the atmosphere around the work station 16.

The collector housing 220 is maintained in a spaced apart relationship with respect to can lid 12 during movement of the can lid 12 to and from work station 16 and during spraying of can lid 12. The space between the collector housing 220 and the surface of the can lid 12 at the work station 16 is approximately the same as the spacing between the nozzle 52 and the surface of the can lid 12, that is, approximately 1/8 to 3/16 of an inch. Since the excess powder collector housing 220 is mounted on the nozzle cone 204, operation of the adjustment assembly 96 positions the excess powder collector 142 relative to can lid 12. By having the collector housing 220 spaced from the can lid 12 at all times, the conveyor 14 (FIGS. 1 and 2) can quickly move the can lid 12 to and from the work station 16.

Collector housing 220 is supported on nozzle cone 204. A conical outer side surface 224 on nozzle cone 204 cooperates with a conical inner side surface 226 on collector housing 142 to form the generally conical chamber 218 in which excess powder is collected. The chamber 218 has a generally annular cross sectional configuration in a plane which extends perpendicular to the longitudinal central axis of spray gun 18.

Figure 2:
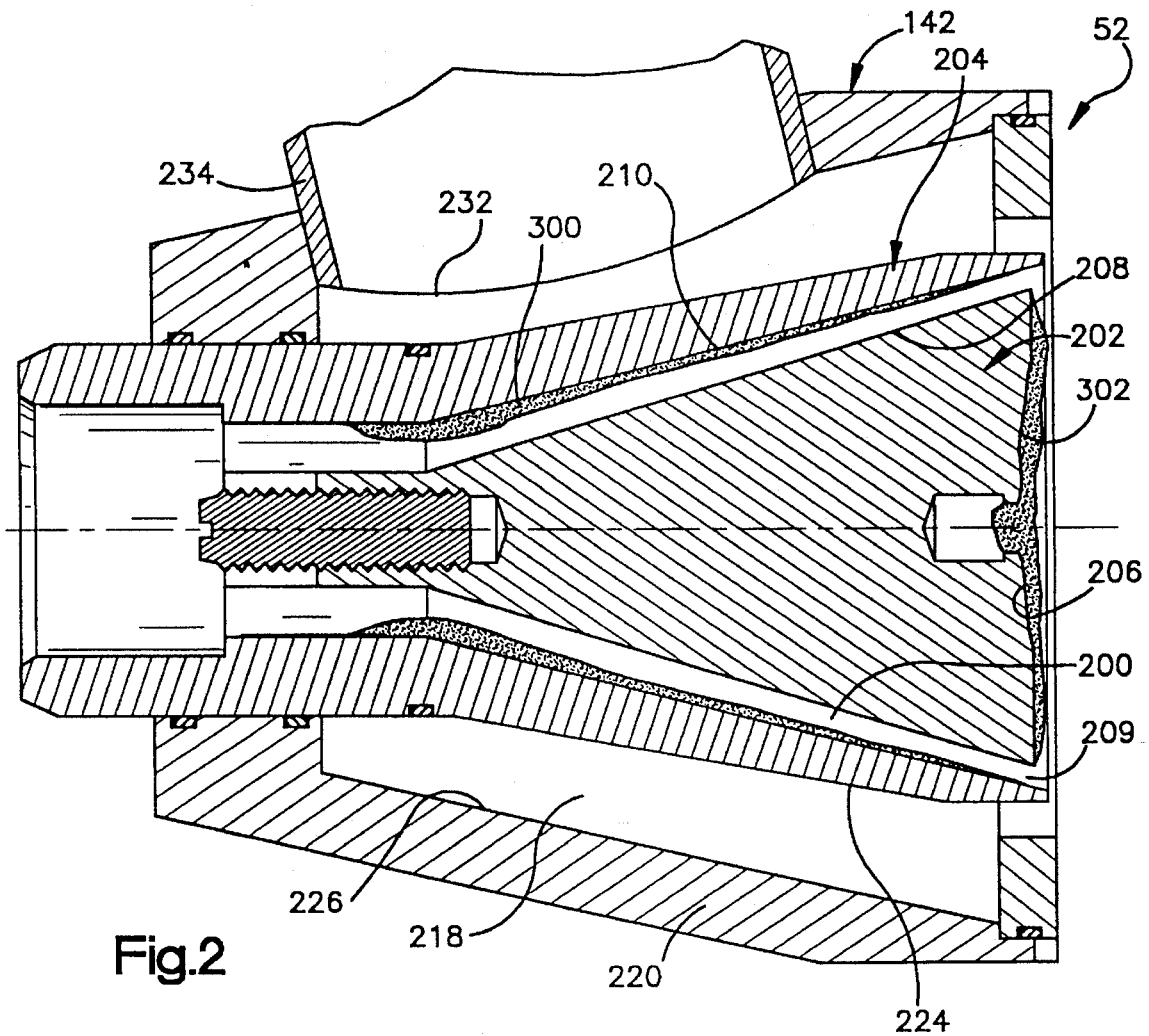
FIG. 2 is an enlarged fragmentary illustration of a nozzle assembly used in the apparatus of FIG. 1 to direct powder toward workpieces, the manner in which powder tends to accumulate on surfaces of the nozzle assembly is indicated schematically in FIG. 2.

A continuously operated venturi-type fluid amplifier 230 (FIG. 1) is mounted on the collector container 92 and is connected in fluid communication with excess powder chamber 218 by a conduit 234. Amplifier 230 provides a pumping action which continuously reduces the fluid pressure in the conduit 234 and draws oversprayed powder away from the surface of the can lid 12 into the chamber 218 (FIG. 2). This flow of powder is conducted through a circular outlet 232 from chamber 218 to conduit 234 (FIG. 2) leading away from excess powder collector 142 and into powder collector container 92. Since amplifier 230 is continuously operating, it produces a continuous flow of air away from the work station 16. Therefore, any oversprayed powder produced at work station 16 at any time is drawn into chamber 218 and transported to collector 92.

Diverter Assembly

The diverter assembly 82 (FIGS. 2 and 4) periodically diverts powder flowing through spray gun 18 away from the nozzle 52. The diverter assembly 82 is normally in an active condition directing air or powder flow in gun 18 away from the nozzle assembly 52 through passages 238 and 240 (FIG. 1) leading to the conduits 86 and 88. When powder is to be sprayed from the nozzle assembly 52 onto a lid 12, the diverter assembly 82 is changed to an inactive condition in which it does not divert powder flowing through the gun away from nozzle assembly 52 but instead allows it to pass into and through nozzle assembly 52. Then when the flow of powder from the nozzle assembly 52 is to be interrupted again, diverter assembly 82 is changed back to the active condition in which powder flow from the main passage 84 of gun 18 is diverted into passages 238 and 240.

The diverter assembly 82 includes a pair of air amplifiers 244 and 246 which induce a flow of air and powder from the main passage 84 to the diverter conduits 86 and 88 when the diverter assembly is in its normal active condition. The flow of air and powder from the main passage 84 through the amplifiers 244 and 246 is conducted by the conduits 86 and 88 to the hopper 168 of the powder collector 92. When the diverter assembly 82 is in an inactive condition, the amplifiers 244 and 246 are turned off and are therefore ineffective to induce a flow of air and powder from the main passage 84.

To induce a flow of air with powder entrained therein from the main passage 84 through the amplifier 244 to the conduit 86, a solenoid valve 258 is actuated to an open condition to direct a flow of air under pressure to an to the amplifier. The flow of air through the amplifier 244 draws air with powder entrained therein, from the main passage 84 through diverter passage 238 to the conduit 86.

The diverter assembly 82 includes a second amplifier 246 having the same construction as the amplifier 244. The amplifier 246 is effective to induce a flow of air with powder entrained therein through diverter passage 240 from a side of the main passage 84 opposite to the amplifier 244. The combined effect of the two amplifiers 244 and 246 is to induce the entire flow of air with powder entrained therein to leave the main passage 84 and flow through the diverter assembly 82 to the conduits 86 and 88, so that flow towards spray nozzle 52 is cut off. A second solenoid 264 is provided to control the flow of air to the amplifier 246.

Powder Spray Nozzle Assembly—Second Embodiment

During use of the powder spray nozzle assembly 52 of FIG. 2, powder may tend to accumulate on surfaces of the nozzle assembly. Thus, during the use of the nozzle assembly 52, powder may tend to accumulate on the inner side surface 210 (FIG. 2) of the nozzle cone 204 in the manner illustrated schematically at 300 in FIG. 2. In addition, powder may tend to accumulate on the end face 206 of the deflector cone 202 in the manner indicated schematically at 302 in FIG. 2.

The accumulation of powder on these surfaces and/or other surfaces in the nozzle assembly 52 is detrimental to the operation of the nozzle assembly. Thus, the accumulation on powder on one or more surfaces of the nozzle assembly 52 will tend to interfere with or modify the flow of air with powder entrained therein through the nozzle assembly. In addition, the accumulation of powder on one or more surfaces of the nozzle assembly 52 may interfere with the obtaining of a desired pattern of application of powder to a workpiece, such as a can lid 12.

In accordance with a feature of the invention, a nozzle assembly 320 (FIG. 3) is constructed so as to retard the accumulation of powder on one or more surfaces in the nozzle assembly. The accumulation of powder on a surface in the nozzle assembly 320 is retarded by conducting a flow of air or other fluid to the surface in the nozzle assembly. Although the fluid could be directed across the surface in the nozzle assembly on which the accumulation of powder is to be retarded, in the illustrated embodiment of the nozzle assembly, the fluid is conducted through openings in the surface on which the accumulation of powder is to be retarded.

Although the nozzle assembly 320 could be utilized in many different types of systems to direct a flow of air and powder toward a workpiece, the nozzle assembly 320 is advantageously used in place of the nozzle assembly 52 in the apparatus 10 of FIG. 1. The nozzle assembly 320 (FIG. 3) includes a base or outer nozzle cone 324 having a conical side wall 326. The conical side wall 326 has a 20 conical inner side surface 328 on which powder may tend to accumulate in the manner indicated schematically at 300 (FIG. 2) for the nozzle assembly 52.

The nozzle assembly 320 (FIG. 3) also includes a generally conical inner deflector cone 332 which is disposed in a coaxial relationship with the nozzle cone 324. The conical deflector cone 332 is mounted on a plurality of supports 334 which extend between a base portion 336 of the deflector cone 324 and the nozzle cone 332. In the illustrated embodiment of the nozzle 320, there are three supports which are spaced apart equal angular distances and extend between the deflector cone 324 and the deflector cone 332. Of course, any desired number of supports 334 could be used for the inner deflector cone 332.

The inner deflector cone 332 has a conical outer side surface 342. The conical outer side surface 342 of the deflector cone 332 cooperates with the conical inner side surface 328 of the nozzle cone 324 to define a flow path 344 along which pulses of air with powder entrained therein are conducted through the nozzle assembly 320 toward a workpiece, that is, a can lid 12. The flow path 344 has a generally conical configuration and, when viewed on a plane extending perpendicular to a longitudinal central axis 346 of the nozzle assembly 320, has an annular configuration. The inner and outer diameter of the annular cross-sectional configuration of the flow path 344 increases from left to right (as viewed in FIG. 3) along the flow path 344.

An excess powder collector 350 has a housing 352 which extends around the nozzle cone 324. The excess powder collector housing 352 is supported by the base portion 336 of the nozzle cone 324.

During operation of the apparatus with which the nozzle assembly 320 is connected, that is, the apparatus 10 of FIG. 1, the excess powder collector 350 (FIG. 3) draws in a flow of excess powder which does not adhere to a workpiece. The excess powder collector 350 induces a flow of air and power away from the workpiece and back toward the nozzle assembly 320. The reverse or backflow of overspray powder is drawn into a generally conical cavity 354 in the excess powder collector 350. The flow of excess powder away from the workpiece into the cavity 354 prevents powder from entering the atmosphere around the workpiece.

The entire nozzle assembly 320, including the excess powder collector housing 352, is maintained in a spaced apart relationship with a workpiece during movement of the workpiece to and from the work station and during spraying of powder onto the workpiece in the same manner as previously described in conjunction with the apparatus 10 of FIG. 1. A conduit 358 (FIG. 3) is connected in fluid communication with a continuously operated venturi-type fluid amplifier, corresponding to the fluid amplifier 230 of FIG. 1, to provide a source of vacuum or reduced pressure which draws oversprayed powder away from the surface of a can lid 12 into the cavity 354 in the excess powder collector 350. Therefore, any oversprayed powder produced during spraying of powder on a workpiece is conducted through the excess powder collector 350 to a powder collector, corresponding to the powder collector 92 of FIG. 1, through the conduit 358.

A diverter assembly, corresponding to the diverter assembly 82 of FIG. 1, is connected with an inlet 362 (FIG. 3) to the flow path 344 through the nozzle assembly 320. Upon operation of the diverter assembly to an active condition in the manner previously described in conjunction with the apparatus of FIG. 1, the fluid pressure at the inlet 362 to the nozzle assembly 320 is reduced. This results in a tendency for any powder suspended in air in the flow path 344 through the nozzle assembly 320 to be drawn backward or upstream, that is toward the left as viewed in FIG. 3, into the diverter assembly. It is contemplated that the diverter assembly which is connected with the inlet 362 to the nozzle assembly 320 may have the same construction and mode of operation as the diverter assembly 82 of FIG. 1.

In accordance with a feature of the present invention, a plurality of openings 366 (FIGS. 3, 4, 5 and 6) are formed in the side wall 326 of the nozzle cone 324. Fluid (air) is conducted through the openings 366 and swirled along the conical inner side surface 328 of the nozzle cone 326 to retard the accumulation of powder on the inner side surface of the nozzle cone.

Figure 4:
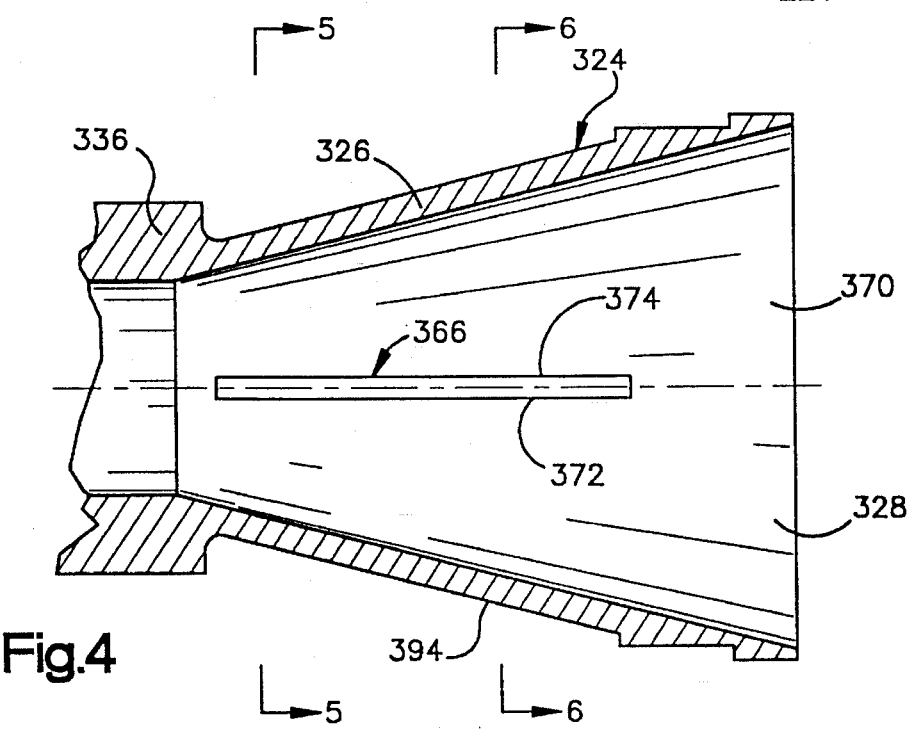
FIG. 4 (on sheet 2 of the drawings) is a fragmentary sectional view, on a reduced scale, illustrating the construction of a nozzle cone which is used in the nozzle assembly of FIG. 3.

Although the openings 366 could have many different configurations, the openings 366 are advantageously formed as slots which extend axially along the conical side wall 326 of the nozzle cone 324 (FIG. 4). Although the slots 366 could have many different configurations, in the embodiment of the nozzle cone illustrated in FIG. 4, each of the slots has a linear configuration with a longitudinal central axis which is parallel to the inner side surface 328 of the nozzle cone 324. The slots 366 extend from a location immediately adjacent to the base or inner end portion 336 of the nozzle cone 324 to a location adjacent to the outer end or outlet portion 370 of the nozzle cone 324.

Each of the slots 366 includes a pair of flat parallel longitudinally extending side surfaces 372 and 374 (FIGS. 5 and 6). The side surfaces 372 and 374 of the slots 366 are skewed relative to radii of the inner side surface 328 of the nozzle cone 324 which extend through the slots 366. The side surfaces 372 and 374 of the slots 366 extend tangentially to the inner side surface 328 of the outer nozzle cone 324. Due to the tangential relationship of the side surfaces 372 and 374 of the slots 366 to the inner side surface 328 of the nozzle cone 324, fluid (air) conducted through the slots 366 flows around the inner side surface 328 of the nozzle cone 324 with a swirling action indicated schematically by the arrows 378 in FIGS. 5 and 6.

Fluid is conducted to the openings or slots 366 in the nozzle cone 324 from a source of fluid pressure. Thus, a pump 382 (FIG. 3) is operable to supply fluid (air) under pressure to a conduit 384 through a flow control valve 386. The conduit 384 is connected with a manifold chamber 390 which extends around the nozzle cone 324. The manifold chamber 390 is formed between the manifold wall 392 and an outer side surface 394 on the nozzle cone 324. The manifold chamber 390 has a generally conical configuration and has an annular cross-sectional configuration as viewed in a plane extending perpendicular to the longitudinal central axis 346 of the nozzle assembly 320.

After a pulse of air with powder entrained therein has been conducted through the nozzle assembly 320 along the flow path 344 between the inner deflector cone 332 and the nozzle cone 324, the flow control valve 386 (FIG. 3) is actuated to an open condition by a solenoid actuator 400. Opening the flow control valve 386 enables a puff or pulse of fluid, that is, air, to be conducted through the conduit 384 to the manifold chamber 390. This pulse of fluid is conducted through the slots 366 in the side wall 326 of the nozzle cone 324.

The pulse of fluid (air) is introduced into the flow path 344 in a generally tangential direction to the inner side surface 328 of the side wall 326. This results in the pulse of fluid moving around the inner side surface 328 with a swirling action which tends to dislodge any powder which may have accumulated on the conical inner side surface 326 of the nozzle cone 324 or on the conical outer side surface 342 of the inner deflector cone 332. This powder becomes suspended in the swirling flow of fluid in the flow path 344.

The swirling flow of fluid and the powder suspended therein is conducted from the nozzle assembly 320. A portion of the fluid (air) with powder suspended therein is conducted in an upstream direction, that is in a direction opposite to the arrows 404 and 406 in FIG. 3 through the inlet 362 to the diverter assembly 82 (FIG. 1).

As was previously explained, the solenoid valves 258 and 264 (FIG. 1) effect operation of the amplifiers 244 and 246 to draw in the trailing end portion of each pulse of powder conducted from the electrostatic charging unit 76 in the spray gun 18 to the powder collector 92. Shortly after the diverter assembly 82 has been activated to divert the trailing end portion of a pulse of air with electrostatically charged powder therein to the powder collector 92, the flow control valve 386 is opened. A pulse of fluid (air) then flows from the manifold chamber 390 through the slots 366.

The flow of fluid (air) from the slots 366 enters the flow path 344 with a swirling action to suspend in the fluid any powder which may have remained on surfaces along the flow path. The fluid in which this powder is suspended is drawn from the flow path 344 through the inlet 362 (FIG. 3) to the nozzle assembly 320. The active diverter assembly 82 induces the fluid (air) with powder suspended therein to flow upstream or toward the left (as viewed in FIGS. 1 and 3) into the diverter assembly. The fluid and powder suspended therein are then conducted through the conduits 86 and 89 to the powder collector container 92.

While a substantial portion of the fluid with suspended powder is being withdrawn from the flow path 344 by the diverter assembly 82, the excess powder collector 350 (FIG. 3) is also effective to withdraw air and powder suspended therein from the flow path 344. The excess powder collector 350 has an annular opening 410 which is continuously connected with a source of low pressure or vacuum through the conduit 358. Therefore, fluid (air) with powder suspended therein which is adjacent to the outlet portion of the flow path 344 is drawn in the direction of the arrow 406 in FIG. 3 from the flow path. This fluid and powder then is drawn back into the cavity 354 in the excess powder collector housing 352. Thus, any powder which may tend to accumulate on surfaces along the flow path 344 is withdrawn in opposite directions from the nozzle assembly 320 after each pulse of air with electrostatically charged powder entrained therein has been conducted along the flow path 344.

In accordance with another feature of the invention, openings are formed in an end surface 414 (FIG. 3) of the inner deflector cone 332 to enable fluid (air) to be conducted through the openings and prevent the accumulation of powder on the end surface 414. The flat, circular end surface 414 of the inner deflector cone 332 faces toward the workpiece, that is, a can lid 12. During use of the nozzle assembly 320, powder tends to accumulate on the end surface 414 in the manner indicated schematically at 302 (FIG. 2) for the nozzle assembly 52.

The end surface 414 (FIG. 3) is disposed on a porous screen 416. The porous screen 416 has an inner side surface 418 which extends parallel to the end surface 414. The inner side surface 418 of the screen 416 cooperates with an interior surface 420 in the inner deflector cone 332 to form a fluid pressure chamber 424. The chamber 424 has a configuration which corresponds to the configuration of a frustrum of a cone.

Fluid (air) is supplied by a pump 428. The pump 428 connected in fluid communication with the chamber 424 through a conduit 430 and a flow control valve 432. The conduit 430 is connected with an annular manifold chamber 436 which extends around the base portion 336 of the nozzle cone 324.

The annular manifold chamber 436 is connected in fluid communication with the pressure chamber 424 in the inner deflector cone 332 through passages in the supports 334. Thus, each of the supports 334 has a passage 440 which extends between the manifold chamber 436 and a chamber 442 formed in a central portion of the base portion 336 of the outer deflector cone 324. The chamber 442 is closed by a suitable plug 444. The chamber 442 is connected in fluid communication with the chamber 424 through a passage 448 which extends axially through the inner deflector cone 332.

A solenoid actuator assembly 452 maintains the flow control valve 432 in an open condition during operation of the apparatus 10 (FIG. 1) with which the nozzle assembly 320 is associated. This enables fluid under pressure to continuously flow through the flow control valve 432, the conduit 430 and passage 448 in the inner deflector cone 332 to the fluid pressure chamber 424. Fluid under pressure is conducted from the chamber 424 through the screen 416 to dislodge and suspend any powder which may accumulate on the end surface 414 of the inner deflector cone 332.

In the illustrated embodiment of the invention, the screen 416 is a rigid porous plate. In this specific embodiment of the invention, the screen 416 is formed of porous high density polyethylene which was obtained from Porex Technologies of 500 Fairfaun, Ga. 30213 under the designation X-4916. The porous high density polyethylene forming the screen 416 is rigid and has a thickness of approximately one-sixteenth of an inch.

Although it is preferred to use a rigid polymeric material to form the porous screen 416, the screen could be formed of other materials if desired. For example, the screen 416 could be formed of cloth or other woven material. If desired, the screen 416 could be formed by a porous membrane.

In the illustrated embodiment of the invention, the flow control valve 432 is maintained in an open condition so that there is a continuous flow of fluid (air) through the porous screen 416. However, if desired, the flow control valve 432 could be operated so as to pulse the fluid pressure supplied to the pressure chamber 424 in unison with the pulsing of the air pressure supplied to the manifold chamber 390 through the flow control valve 386. This results in air being conducted through the porous screen 416 only when the flow of air with electrostatically charged powder entrained therein along the flow path 344 is interrupted. It is believed that pulsing the flow of air to the pressure chamber 424 by operating the flow control valve 432 may be advantageous in operating conditions in which the pattern of powder being applied to a workpiece, such as a can lid 12, may be disturbed by the flow of air through the porous screen 416.

In the embodiment of the invention illustrated in FIGS. 4–6, the slots 366 in the nozzle cone 324 have a linear configuration. However, it is contemplated that the slots could have a curving configuration. The embodiment of the invention illustrated in FIGS. 7–10 has a nozzle cone with curving slots which extend circumferentially around the nozzle cone and form a portion of a spiral. Since the embodiment of the invention illustrated in FIGS. 7–10 is generally similar to the embodiment of the invention illustrated in FIGS. 4–6, similar numerals will be utilized to designate similar components, the suffix letter "a" being associated with the numerals of FIGS. 7–10 to avoid confusion.

The nozzle cone 324a (FIG. 7) has a conical side wall 326a with inner side surface 328a and an outer side surface 394a. Slots 366a are formed in the side wall 326a and extend from a base or inner portion 336a of the nozzle cone 324a to an outer end portion 370a of the nozzle cone 324a. The slots 366a have side walls 372a and 374a which extend tangentially to the inner side surface 328a of the side wall 326a of the nozzle cone 324a. The side walls 372a and 374a of the slots 366a are skewed relative to the longitudinal central axis 364a. The side surfaces 372a and 374a of the slots 366a extend tangentially to the inner side surface 328a of the side wall 326a to cause the fluid which flows through the slots 366a to swirl around the inner side surface 328a of the nozzle cone 324a.

Although the openings in the nozzle cone 324a are slots, it is contemplated that the openings could have a different configuration if desired. For example, the air from the manifold surrounding the nozzle cone 324a could be introduced to the interior of the nozzle cone 324a through a porous screen having a construction generally similar to the construction of the porous screen 416 of FIG. 3 if desired.

Conclusion

In view of the foregoing description, it is apparent that the present invention relates to an apparatus 10 for use in applying powder to workpieces 12. The apparatus 10 includes a new and improved nozzle assembly 320 which directs a flow of air with powder entrained therein toward workpieces which may be can lids 12. The apparatus 10 may include a pump 54 which is operable to produce a flow of air with powder entrained therein. A charging apparatus 76 may be connected in fluid communication with the pump 54 to electrostatically charge powder in the flow of air.

In accordance with a feature of the present invention, the nozzle assembly 320 is constructed so as to retard the accumulation of powder on surfaces of the nozzle assembly. This may be accomplished by conducting a flow of fluid, such as air, to the surfaces in the nozzle assembly 320 on which powder tends to accumulate. Thus, fluid may be directed through openings in a surface on which powder tends to accumulate.

The surface on which powder tends to accumulate may be a surface 328 of a side wall 326 in the nozzle assembly 320. A flow of fluid is conducted through openings, such as slots 366, in the side wall 326. The flow of fluid through the openings retards the accumulation of powder on the side wall.

The surface on which powder tends to accumulate may be an end surface 414 of the nozzle assembly 320. A flow of fluid, such as air, may be conducted through openings in the end surface 414 of the nozzle assembly 320 to retard the accumulation of powder on the end surface of the nozzle assembly.

The nozzle assembly 320 may advantageously be associated with an apparatus 10 in which a diverter 82 is provided to divert a portion of each pulse of a series of pulses of air with powder entrained therein away from the nozzle assembly. The fluid which is directed through openings in the surface 328 in the nozzle assembly 320 on which powder tends to accumulate, causes the powder to become suspended in the fluid. The diverter 82 induces a flow of the fluid, with the powder suspended therein, in a reverse or upstream direction through the nozzle to the diverter.

The apparatus 10 with which the nozzle assembly 320 is associated may advantageously be provided with an excess powder collector 352. The excess powder collector 352 tends to induce a flow of the fluid, with powder suspended therein, in a downstream or forward direction from the nozzle assembly 320.

Having described the invention, the following is claimed:

1. A nozzle assembly for use in directing a flow of air and powder toward a workpiece, said nozzle assembly comprising a side wall which at least partially defines a flow path of air and powder from an inlet to said nozzle assembly to an outlet from said nozzle assembly, said side wall having an inner side surface along which the flow of air and powder is conducted and on which powder tends to accumulate, a plurality of openings formed in said side wall at locations between the inlet to said nozzle assembly and the outlet from said nozzle assembly, and a conduit connected in fluid communication with a source of fluid pressure and with the openings in said side wall to conduct fluid which flows from the source of fluid pressure through the openings in said side wall into the flow path of air and powder through said nozzle assembly to retard accumulation of powder on the inner side surface of said side wall, said plurality of openings in said side wall include a plurality of slots which extend along said side wall from a location adjacent to an inlet portion of said nozzle assembly to a location adjacent to an outlet portion of said nozzle assembly.

2. A nozzle assembly as set forth in claim 1 wherein said inner side surface of said side wall has a circular cross-sectional configuration and flares radially and axially outward in a direction away from the inlet to said nozzle assembly, each slot of said plurality of slots having longitudinally extending side surfaces which are skewed relative to radii of the inner side surface of the side wall which extend through the slot, said side surfaces of said slots being effective to direct fluid flow from the source of fluid pressure into the flow path of air and powder through said nozzle assembly in a direction which is generally tangential to the inner side surface of said side wall to obtain a swirling fluid flow along the inner side surface of said side wall.

3. A nozzle assembly as set forth in claim 1 wherein each of said slots has a linear longitudinal central axis.

4. A nozzle assembly as set forth in claim 1 wherein each of said slots has a curving longitudinal central axis.

5. A nozzle assembly as set forth in claim 1 further including a manifold wall extending around said side wall and cooperating with said side wall to at least partially define a manifold chamber which is connected in fluid communication with said slots in said side wall and with said conduit.

6. A nozzle assembly as set forth in claim 5 further including an excess powder collector housing at least partially enclosing said manifold wall and cooperating with said manifold wall to at least partially define an excess powder collector chamber, said excess powder collector housing at least partially defining an excess powder collector chamber opening disposed adjacent to and extending around the outlet from said nozzle assembly, a second conduit connected in fluid communication with a source of reduced fluid pressure and with said excess powder collector chamber to induce a flow of air and excess powder into said excess powder collector chamber through the excess powder collector chamber opening.

7. A nozzle assembly as set forth in claim 1 further including control means for establishing a flow of air and powder along the flow path through said nozzle assembly toward the workpiece and for interrupting the flow of air and powder along the flow path through said nozzle assembly, said control means being operable to establish a flow of fluid from the source of fluid pressure through said conduit and the slots in said side wall into the flow path of air and powder through said nozzle assembly when the flow of air and powder through said nozzle assembly has been interrupted.

8. A nozzle assembly as set forth in claim 1 further including a deflector which is at least partially enclosed by said side wall and which cooperates with said side wall to at least partially define the flow path of air and powder from the inlet to said nozzle assembly to the outlet from said nozzle assembly, said deflector having an end surface which faces toward the workpiece, and a second conduit for conducting a flow of fluid to said end surface on said deflector to retard accumulation of powder on said end surface of said deflector.

9. A nozzle assembly as set forth in claim 8 wherein said deflector includes a body portion and a porous screen which cooperate to at least partially define a chamber in said deflector, said porous screen having an outer side surface area which at least partially defines said end surface of said deflector, said second conduit being connected in fluid communication with said chamber in said deflector to enable fluid to flow into said chamber in said deflector and from said chamber in said deflector through said porous screen.

10. A nozzle assembly for use in directing a flow of air and powder toward a workpiece, said nozzle assembly comprising a side wall which at least partially defines a flow path of air and powder from an inlet to said nozzle assembly to an outlet from said nozzle assembly, said side wall having an inner side surface along which the flow of air and powder is conducted and on which powder tends to accumulate, a plurality of openings formed in said side wall at locations between the inlet to said nozzle assembly and the outlet from said nozzle assembly, a deflector which is at least partially enclosed by said side wall and which cooperates with said side wall to at least partially define the flow path of air and powder from the inlet to said nozzle assembly to the outlet from said nozzle assembly, said deflector having an end surface which faces toward the workpiece, a first conduit connected in fluid communication with a source of fluid pressure and with the openings in said side wall to conduct fluid which flows from the source of fluid pressure through the openings in said side wall into the flow path of air and powder through said nozzle assembly to retard accumulation of powder on the inner side surface of said side wall, and a second conduit for conducting a flow of fluid to said end surface on said deflector to retard accumulation of powder on said end surface of said deflector.

11. A nozzle assembly as set forth in claim 10 wherein said deflector includes a body portion and a porous screen which cooperate to at least partially define a chamber in said deflector, said porous screen having an outer side surface area which at least partially defines said end surface of said deflector, said second conduit being connected in fluid communication with said chamber in said deflector to enable fluid to flow into said chamber in said deflector and from said chamber in said deflector through said porous screen.

12. A nozzle assembly as set forth in claim 10 further including an excess powder collector at least partially defining an excess powder collector chamber having an opening disposed adjacent to and extending around said end surface on said deflector, a third conduit connected in fluid communication with a source of reduced fluid pressure and with said excess powder collector chamber to induce a flow of air and powder away from said end surface on said deflector and into said excess powder collector chamber through the excess powder collector chamber opening.

13. A nozzle assembly as set forth in claim 10 further including control means for establishing a flow of air and powder along the flow path through said nozzle assembly toward the workpiece and for interrupting the flow of air and powder along the flow path through said nozzle assembly, said control means being operable to establish a flow of fluid from the source of fluid pressure through said second conduit to said end surface on said deflector when the flow of air and powder through said nozzle assembly has been interrupted.

14. A nozzle assembly for use in directing a flow of air and powder toward a workpiece, said nozzle assembly comprising a side wall having an inner side surface, a deflector which is at least partially enclosed by said side wall and which cooperates with the inner side surface of said side wall to at least partially define a flow path along which a flow of air and powder is conducted, said deflector having an end surface which faces toward the workpiece and on which powder tends to accumulate, and a conduit connected in fluid communication with a source of fluid pressure and said end surface of said deflector to conduct fluid which flows from the source of fluid pressure to said end surface of said deflector to retard accumulation of powder on said end surface of said deflector.

15. A nozzle assembly as set forth in claim 14 wherein said end surface of said deflector is disposed on a porous screen through which a flow of fluid from said conduit is conducted to retard accumulation of powder on said end surface of said deflector.

16. A nozzle assembly as set forth in claim 14 wherein said deflector includes a chamber which is disposed within said deflector and which is connected in fluid communication with said conduit, said deflector having a plurality of passages through which fluid flows from said chamber in said deflector to said end surface of said deflector.

17. A nozzle assembly as set forth in claim 14 wherein said deflector includes a body portion connected with said side wall by a plurality of supports which extend between said side wall and said body portion of said deflector, said conduit including a first passage section which extends through one of said supports and a second passage section which is at least partially disposed within said body portion of said deflector, said second passage section extending from said first passage section to a chamber disposed adjacent to said end surface of said deflector, and a plurality of passages extending from said chamber to said end surface of said deflector.

18. A nozzle assembly as set forth in claim 14 further including a plurality of openings formed in said side wall and a second conduit connected in fluid communication with a source of fluid pressure and with the openings in said side wall to conduct fluid which flows from the openings in said side wall into space between said side wall and said body portion of said deflector.

19. An apparatus for use in sequentially applying powder to each workpiece of a plurality of workpieces, said apparatus comprising a spray device which sprays powder on each of said workpieces in turn while said workpiece is at a work station, said spray device including components which produce pulses of air with powder entrained therein, a body section connected with said components which produce pulses of air and in which a flow of pulses of air with powder entrained therein is conducted, charging elements which are connected with said body section and electrostatically charges powder entrained in the flow of pulses of air in said body section, a nozzle connected with said body section to spray powder onto each of said workpieces in turn at said work station, said nozzle being effective to spray powder in one of said pulses of air with powder entrained therein onto one of said workpieces and to spray powder in a pulse of air with powder entrained therein next succeeding said one pulse of air with powder entrained therein onto a workpiece next succeeding said one workpiece, said nozzle having an inner side surface along which the pulses of air with powder entrained therein are conducted and on which powder tends to accumulate, a plurality of openings formed in said inner side surface of said nozzle, a conduit connected in fluid communication with a source of fluid pressure and with the openings in said inner side surface of said nozzle to conduct fluid which flows through openings in said inner side surface of said nozzle into a flow path of pulses of air with powder entrained therein through said nozzle, and a diverter located upstream of said nozzle and connected with said body section to divert away from said nozzle a portion of at least some of the pulses of air with powder entrained therein and to induce a flow of fluid with powder suspended therein from said nozzle into said diverter between pulses of air with powder entrained therein.

20. An apparatus for use in sequentially applying an annular band of powder to a surface of each can lid of a plurality of can lids, said apparatus comprising a conveyor which is operable to move each of said can lids in turn to and from a work station, and a spray device disposed adjacent to said conveyor, said spray device being operable to spray an annular band of powder on one surface of each of said can lids in turn while each of said can lids is held at said work station by said conveyor in a spaced apart relationship with said spray device, said spray device including a body section in which a flow of air with powder entrained therein is conducted, a charging apparatus connected with said body section to electrostatically charge powder entrained in said flow of air in said body section, a nozzle connected with said body section and spaced apart from said one surface of each of said can lids during movement of each of said can lids in turn to and from said work station and during spraying of an annular band of powder onto each of said can lids at said work station, said nozzle including an inner deflector element which has an outer side surface which flares outwardly in the direction of flow of the stream of air with electrostatically charged powder entrained therein and which is engaged by the flow of the stream of air with electrostatically charged powder entrained therein, said nozzle including a side wall having an inner side surface which flares outwardly in the direction of flow of the stream of air with electrostatically charged powder entrained therein and which circumscribes at least a part of said outer side surface of said inner deflector element and is engaged by the flow of the stream of air with electrostatically charged powder entrained therein, said outer side surface of said inner deflector element and said inner side surface of said side wall cooperating to define a flow path which has an annular cross sectional configuration and which flares outwardly in the direction of flow of the stream of air with electrostatically charged powder entrained therein, said inner deflector element having an end surface which faces toward the work station and on which powder tends to accumulate, a conduit connected in fluid communication with a source of fluid pressure and said end surface of said inner deflector element to conduct fluid which flows from the source of fluid pressure to said end surface of said inner deflector element to retard accumulation of powder on said end surface of said inner deflector element, and an excess powder collector at least partially enclosing said nozzle to draw a flow of excess powder away from said one surface of a can lid held at said work station by said conveyor and into said excess powder collector and to draw a flow of fluid with powder suspended therein away from said end surface of said inner deflector element and into said excess powder collector, said excess powder collector being spaced apart from said one surface of said can lid at said work station during flow of the stream of air and powder through said space between said nozzle and said one surface of said can lid at said work station and during a flow of excess powder away from said one surface of said can lid at said work station into said excess powder collector.

21. An apparatus as set forth in claim 20 further including a diverter located between said charging apparatus and said nozzle and connected with said body section to divert a flow of air and electrostatically charged powder being conducted in said body section away from said nozzle to interrupt a flow of powder from said nozzle toward said can lid at said work station while the flow path between the outer side surface of the inner deflector element and the inner side surface of the side wall remains open to facilitate spraying an annular band of powder on a next succeeding can lid.

22. A method comprising the steps of utilizing a nozzle assembly to direct a flow of air with powder entrained therein toward a workpiece, said step of utilizing a nozzle assembly to direct a flow of air with powder entrained therein toward a workpiece includes conducting a flow of air with powder entrained therein along a flow path which extends between a deflector having an end surface which faces toward the workpiece and an inner side surface of a side wall which extends around the deflector, retarding accumulation of powder on a surface in said nozzle assembly, said step of retarding accumulation of powder on a surface in said nozzle assembly includes conducting a flow of fluid from a source of fluid pressure through openings in the surface in the nozzle assembly, said step of conducting a flow of fluid from a source of fluid pressure through openings in the surface of the nozzle assembly includes conducting a flow of fluid through openings in said side wall and swirling the fluid along the inner side surface of the side wall, and conducting a flow of fluid from a source of fluid pressure through openings in the end surface of the deflector to retard accumulation of powder on the end surface of the deflector.

23. A method comprising the steps of utilizing a nozzle assembly to direct a flow of air with powder entrained therein toward a workpiece, said step of utilizing a nozzle assembly to direct a flow of air with powder entrained therein toward a workpiece includes conducting a flow of air with powder entrained therein along a flow path which extends between a deflector and a side wall which extends around the deflector, and retarding accumulation of powder on a surface in said nozzle assembly, said step of retarding accumulation of powder on a surface in said nozzle assembly includes conducting a flow of fluid from a source of fluid pressure through openings in the surface in the nozzle assembly, said step of conducting a flow of fluid from a source of fluid pressure through openings in the surface in the nozzle assembly includes conducting a flow of fluid through openings in the end surface of the deflector.

24. A method as set forth in claim 23 wherein said step of conducting a flow of fluid through openings in the surface in the end surface of the deflector includes conducting fluid pressure through a porous screen in the deflector.

25. A method comprising the steps of utilizing a nozzle assembly to direct a flow of air with powder entrained therein toward a workpiece, said step of utilizing a nozzle assembly to direct a flow of air with powder entrained therein toward a workpiece includes conducting a flow of air with powder entrained therein along a flow path which extends between a deflector and a side wall which extends around the deflector, and retarding accumulation of powder on a surface in said nozzle assembly, said step of retarding accumulation of powder on a surface in said nozzle assembly includes conducting a flow of fluid from a source of fluid pressure through openings in the surface in the nozzle assembly, said step of conducting a flow of fluid from a source of fluid pressure through openings in the surface in the nozzle assembly includes conducting a flow of fluid from the source of fluid pressure to a chamber in the deflector, and conducting a flow of fluid from the chamber in the deflector through a plurality of passages extending from the chamber in the deflector through an end surface of the deflector.

26. An apparatus for use in sequentially applying powder to each workpiece of a plurality of workpieces, said apparatus comprising a spray device which sprays powder on each of said workpieces in turn while said workpiece is at a work station, said spray device including components which produce pulses of air with powder entrained therein, a body section connected with said components which produce pulses of air and in which a flow of pulses of air with powder entrained therein is conducted, charging elements which are connected with said body section and electrostatically charges powder entrained in the flow of pulses of air in said body section, a nozzle connected with said body section to spray powder onto each of said workpieces in turn at said work station, said nozzle being effective to spray powder in one of said pulses of air with powder entrained therein onto one of said workpieces and to spray powder in a pulse of air with powder entrained therein next succeeding said one pulse of air with powder entrained therein onto a workpiece next succeeding said one workpiece, said nozzle having an inner side surface along which the pulses of air with powder entrained therein is conducted and on which powder tends to accumulate, a plurality of openings formed in said inner side surface of said nozzle, a conduit connected in fluid communication with a source of fluid pressure and with the openings in said inner side surface of said nozzle to conduct fluid which flows through openings in said inner side surface of said nozzle into a flow path of pulses of air with powder entrained therein through said nozzle, and a diverter located upstream of said nozzle and connected with said body section to divert away from said nozzle a portion of at least some of the pulses of air with powder entrained therein and to induce a flow of fluid with powder suspended therein from said nozzle into said diverter between pulses of air with powder entrained therein, said components which produce pulses of air with powder entrained therein includes a source of powder, a pump connected with the source of powder to induce a flow of powder from said source of powder toward said nozzle, said pump being operable between an active condition in which said pump is effective to induce a flow of powder from said source of powder and an inactive condition in which said pump is ineffective to induce a flow of powder from said source of powder, and control means for effecting operation of said pump between said inactive condition and said active condition, said diverter being operable between an active condition in which said diverter is effective to divert a flow of air and powder away from said nozzle and an inactive condition in which said diverter is ineffective to divert a flow of air and powder, said control means being operable to effect operation of said diverter between said inactive condition and said active condition in a predetermined relationship with operation of said pump between said inactive condition and said active condition to enable said diverter to sequentially divert the same portion of each of said pulses of air with powder entrained therein.

27. An apparatus as set forth in claim 26 wherein the portion of each of said pulses which is diverted is a trailing end portion of each of said pulses.

28. An apparatus as set forth in claim 26 further including an excess powder collector at least partially enclosing said nozzle and operable to induce a flow of excess powder away from said workpieces into said excess powder collector and to induce a flow of fluid with powder suspended therein from said nozzle into said excess powder collector between pulses of air with powder entrained therein.

29. An apparatus for use in sequentially applying powder to each workpiece of a plurality of workpieces, said apparatus comprising a spray device which sprays powder on each of said workpieces in turn while said workpiece is at a work station, said spray device including components which produce pulses of air with powder entrained therein, a body section connected with said components which produce pulses of air and in which a flow of pulses of air with powder entrained therein is conducted, charging elements which are connected with said body section and electrostatically charges powder entrained in the flow of pulses of air in said body section, a nozzle connected with said body section to spray powder onto each of said workpieces in turn at said work station, said nozzle being effective to spray powder in one of said pulses of air with powder entrained therein onto one of said workpieces and to spray powder in a pulse of air with powder entrained therein next succeeding said one pulse of air with powder entrained therein onto a workpiece next succeeding said one workpiece, said nozzle having an inner side surface along which the pulses of air with powder entrained therein is conducted and on which powder tends to accumulate, a plurality of openings formed in said inner side surface of said nozzle, a conduit connected in fluid communication with a source of fluid pressure and with the openings in said inner side surface of said nozzle to conduct fluid which flows through openings in said inner side surface of said nozzle into a flow path of pulses of air with powder entrained therein through said nozzle, and a diverter located upstream of said nozzle and connected with said body section to divert away from said nozzle a trailing end portion of at least some of the pulses of air with powder entrained therein and to induce a flow of fluid with powder suspended therein from said nozzle into said diverter between pulses of air with powder entrained therein.

30. An apparatus for use in sequentially applying an annular band of powder to a surface of each can lid of a plurality of can lids, said apparatus comprising a conveyor which is operable to move each of said can lids in turn to and from a work station along an arcuate path, and a spray device disposed adjacent to said conveyor, said spray device being operable to spray an annular band of powder on one surface of each of said can lids in turn while each of said can lids is held at said work station by said conveyor in a spaced apart relationship with said spray device, said spray device including a body section in which a flow of air with powder entrained therein is conducted, a charging apparatus connected with said body section to electrostatically charge powder entrained in said flow of air in said body section, a nozzle connected with said body section and spaced apart from said one surface of each of said can lids during movement of each of said can lids in turn to and from said work station and during spraying of an annular band of powder onto each of said can lids at said work station, said nozzle including an inner deflector element which has an outer side surface which flares outwardly in the direction of flow of the stream of air with electrostatically charged powder entrained therein and which is engaged by the flow of the stream of air with electrostatically charged powder entrained therein, said nozzle including a side wall having an inner side surface which flares outwardly in the direction of flow of the stream of air with electrostatically charged powder entrained therein and which circumscribes at least a part of said outer side surface of said inner deflector element and is engaged by the flow of the stream of air with electrostatically charged powder entrained therein, said outer side surface of said inner deflector element and said inner side surface of said side wall cooperating to define a flow path which has an annular cross sectional configuration and which flares outwardly in the direction of flow of the stream of air with electrostatically charged powder entrained therein, said inner deflector element having an end surface which faces toward the work station and on which powder tends to accumulate, said end surface on said deflector element being disposed on a porous screen through which a flow of fluid from said conduit is conducted to retard accumulation of powder on said end surface of said inner deflector element, a conduit connected in fluid communication with a source of fluid pressure and said end surface of said inner deflector element to conduct fluid which flows from the source of fluid pressure to said end surface of said inner deflector element to retard accumulation of powder on said end surface of said inner deflector element, and an excess powder collector at least partially enclosing said nozzle to draw a flow of excess powder away from said one surface of a can lid held at said work station by said conveyor and into said excess powder collector and to draw a flow of fluid with powder suspended therein away from said end surface of said inner deflector element and into said excess powder collector, said excess powder collector being spaced apart from said one surface of said can lid at said work station during flow of the stream of air and powder through said space between said nozzle and said one surface of said can lid at said work station and during a flow of excess powder away from said one surface of said can lid at said work station into said excess powder collector.

31. An apparatus as set forth in claim 30 wherein said inner deflector element includes a chamber which is disposed within said inner deflector element and which is connected in fluid communication with said conduit, said inner deflector element having a plurality of passages through which fluid flows from said chamber in said inner deflector element to said end surface of said inner deflector element.

32. An apparatus as set forth in claim 30 further including a plurality of openings formed in said side wall and a second conduit connected in communication with a source of fluid pressure and with the openings formed in said side wall to conduct fluid which flows from the openings in said side wall into the flow path of the stream of air with electrostatically charged powder entrained therein.

33. A nozzle assembly for use in directing a flow of air and powder toward a workpiece, said nozzle assembly comprising a side wall which at least partially defines a flow path of air and powder from an inlet to said nozzle assembly to an outlet from said nozzle assembly, said side wall having an inner side surface along which the flow of air and powder is conducted and on which powder tends to accumulate, a plurality of openings formed in said side wall at locations between the inlet to said nozzle assembly and the outlet from said nozzle assembly, a conduit connected in fluid communication with a source of fluid pressure and with the openings in said side wall to conduct fluid which flows from the source of fluid pressure through the openings in said side wall into the flow path of air and powder through said nozzle assembly to retard accumulation of powder on the inner side surface of said side wall, and control means for establishing a flow of air and powder along the flow path through said nozzle assembly toward the workpiece and for interrupting the flow of air and powder along the flow path through said nozzle assembly, said control means being operable to provide a flow of fluid from the source of fluid pressure through said conduit and the openings in said side wall into the flow path of air and powder through said nozzle assembly when the flow of air and powder through said nozzle assembly has been interrupted.

34. An apparatus for applying powder to workpieces, said apparatus comprising a pump operable to produce a flow of air with powder entrained therein, a charging apparatus connected in fluid communication with said pump to electrostatically charge powder in the flow of air with powder entrained therein, a nozzle assembly connected in fluid communication with said charging apparatus to direct the flow of air with powder entrained therein toward a workpiece, means for retarding an accumulation of powder on a surface in said nozzle assembly by conducting a flow of fluid to said surface in said nozzle assembly, and means for interrupting a flow of fluid to said surface in said nozzle assembly during a flow of air with powder entrained therein from said charging apparatus to said nozzle assembly and for establishing a flow of fluid to said surface in said nozzle assembly upon interruption of a flow of air with powder entrained therein from said charging apparatus to said nozzle assembly.

35. An apparatus for applying powder to workpieces, said apparatus comprising means for producing a flow of pulses of air with powder entrained therein, a charging means for electrostatically charging powder in the flow of pulses of air with powder entrained therein, a nozzle assembly connected in fluid communication with said means for producing a flow of pulses of air with powder entrained therein to direct the flow of pulses of air with powder entrained therein toward a workpiece, and means for retarding accumulation of powder on said nozzle assembly, said means for retarding accumulation of powder on said nozzle assembly including a conduit connected in fluid communication with a source of fluid pressure and with said nozzle assembly and control :means for enabling fluid to flow through said conduit to said nozzle assembly between flow of pulses of air with powder entrained therein in said nozzle assembly and for blocking fluid flow through said conduit to said nozzle assembly during flow of pulses of air with powder entrained therein in said nozzle assembly.

36. An apparatus as set forth in claim 35 wherein said nozzle assembly includes a side wall having a plurality of openings connected in fluid communication with said conduit and through which fluid flows between flow of pulses of air with powder entrained therein in said nozzle assembly to retard accumulation of powder on said side wall.

37. An apparatus as set forth in claim 35 wherein said nozzle assembly includes an end surface which faces toward the workpiece, said end surface having a plurality of openings connected in fluid communication with said conduit and through which fluid flows between flow of pulses of air with powder entrained therein in said nozzle assembly to retard accumulation of powder on said end face.

38. A method comprising the steps of conducting a series of pulses of air with powder entrained therein along a flow path which extends from an inlet to a nozzle to an outlet from the nozzle, directing each of the pulses of air with powder entrained therein through the outlet from the nozzle toward a different workpiece of a plurality of workpieces, directing a flow of fluid into the flow path of the pulses of air with powder entrained therein at a location between the inlet to the nozzle and the outlet from the nozzle during an interval between flow of a first pulse in the series of pulses and flow of a next succeeding pulse in the series of pulses to suspend in the fluid powder which remains in the flow path after the first pulse of air with powder entrained therein has been conducted through the nozzle, and conducting at least a portion of the fluid and the powder which is suspended in the fluid from the nozzle.

39. A method as set forth in claim 38 further including the step of conducting a continuous flow of fluid through a surface of the nozzle during performance of said step of conducting a series of pulses of air with powder entrained therein along a flow path which extends from the inlet to the nozzle to the outlet from the nozzle to retard accumulation of powder on the surface of the nozzle.

40. A method as set forth in claim 38 wherein the flow path of the pulses of air with powder entrained therein from the inlet to the outlet of the nozzle is at least partially disposed between a surface on an inner deflector and a surface on a side wall which extends around the inner deflector, said step of directing a flow of fluid into the flow path of the pulses of air with powder entrained therein includes conducting fluid from openings in one of the surfaces into the flow path of the pulses of air with powder entrained therein during the interval between flow of the first pulse in the series of pulses and flow of the next succeeding pulse in the series of pulses between the surface on the inner deflector and the surface on the side wall.

41. A method as set forth in claim 38 wherein said step of conducting a series of pulses of air with powder entrained therein along a flow path which extends from the inlet to the nozzle to the outlet from the nozzle includes conducting the series of pulses of air with powder entrained therein in a first direction along the flow path, said step of conducting at least a portion of the fluid and the powder which is suspended in the fluid from the nozzle includes conducting the fluid and the powder which is suspended in the fluid in a second direction along the flow path, said second direction being opposite to said first direction.

42. A method as set forth in claim 38 further including the step of conducting a portion of each of the pulses of air with powder entrained therein into a diverter conduit to more sharply define an edge portion of each of the pulses of air with powder entrained therein, said step of conducting at least a portion of the fluid and the powder which is suspended in the fluid from the nozzle includes conducting fluid and the powder which is suspended in the fluid into the diverter conduit.

43. A method comprising the steps of producing a flow of pulses of air with powder entrained therein, utilizing a nozzle assembly to direct the flow of pulses of air with powder entrained therein toward workpieces, and retarding accumulation of powder on a surface of the nozzle assembly, said step of retarding accumulation of powder on the surface of the nozzle assembly includes conducting a flow of fluid from a source of fluid pressure through the surface of the nozzle assembly between each of the pulses of air with powder entrained therein.

44. A method as set forth in claim 43 wherein said step of utilizing the nozzle assembly to direct the flow of pulses of air with powder entrained therein toward workpieces includes conducting the flow of pulses of air with powder entrained therein along a flow path having a portion which is disposed between a deflector and a side wall which extends around the deflector, said step of conducting a flow of fluid from a source of fluid pressure through the surface of the nozzle assembly includes conducting the flow of fluid through openings in a surface on the side wall which extends around the deflector.

45. A method as set forth in claim 44 further including the step of interrupting the flow of fluid through the openings in the surface on the side wall which extends around the deflector as each of the pulses of air with powder entrained therein moves along the portion of the flow path which is disposed between the side wall and the deflector.

46. A method as set forth in claim 43 wherein said step of utilizing the nozzle assembly to direct the flow of pulses of air with powder entrained therein toward workpieces includes conducting the flow of pulses of air with powder entrained therein along a flow path which extends past an end of the nozzle assembly, said step of conducting a flow of fluid from a source of fluid pressure through the surface of the nozzle assembly includes conducting the flow of fluid through openings in a surface on the end of the nozzle assembly.

47. A method as set forth in claim 46 further including the step of interrupting the flow of fluid through openings in the surface on the end of the nozzle assembly as each of the pulses of air with powder entrained therein moves past the end of the nozzle assembly.

48. A method as set forth in claim 46 further including the step of maintaining the flow of fluid through openings in the surface on the end of the nozzle assembly as each of the pulses of air with powder entrained therein moves past the end of the nozzle assembly.

49. A method comprising the steps of conducting a series of pulses of air with powder entrained therein in a first direction along a flow path which extends through a nozzle, leaving powder in the nozzle after passage of one of the pulses of air with powder entrained therein through the nozzle, suspending the powder left in the nozzle in fluid after passage of the one pulse of air with powder entrained therein through the nozzle, said step of suspending the powder left in the nozzle in fluid includes directing a flow of fluid into the nozzle after the conducting of the one pulse of air with powder entrained therein through the nozzle in the first direction and prior to conducting a next succeeding pulse of air with powder entrained therein through the nozzle in the first direction, and conducting at least a portion of the fluid with powder suspended therein from the nozzle in a second direction along the flow path which extends through the nozzle, the second direction in which the fluid with powder suspended therein is conducted from the nozzle being opposite to the first direction in which the one pulse of air with powder entrained therein is conducted through the nozzle.

50. A method as set forth in claim 49 wherein said step of conducting the series of pulses of air with powder entrained therein in the first direction along the flow path which extends through the nozzle includes increasing the fluid pressure at an inlet to the nozzle as each pulse of air with powder entrained therein enters the nozzle, said step of conducting fluid with powder suspended therein from the nozzle in the second direction includes decreasing the fluid pressure at the inlet to the nozzle while performing said step of directing a flow of fluid into the nozzle.

51. A method as set forth in claim 49 wherein the flow path of the pulses of air with powder entrained therein through the nozzle is at least partially disposed between a surface on an inner deflector and a surface on a side wall which extends around the inner deflector, said step of directing a flow of fluid into the nozzle includes conducting fluid through openings in one of the surfaces into the flow path of the pulses of air with powder entrained therein.

* * * * *

UNITED STATES PATENT AND TRADEMARK OFFICE
CERTIFICATE OF CORRECTION

PATENT NO. : 5,520,735
DATED : May 28, 1996
INVENTOR(S) : Douglas C. Mulder

It is certified that error appears in the above-indentified patent and that said Letters Patent is hereby corrected as shown below:

Column 16, line 46, change "14" to --17--.

Signed and Sealed this

Twenty-sixth Day of November 1996

Attest:

BRUCE LEHMAN

*Attesting Officer*   *Commissioner of Patents and Trademarks*